United States Patent
Faibish et al.

(10) Patent No.: US 10,411,959 B1
(45) Date of Patent: Sep. 10, 2019

(54) DATA ANALYTICS FOR THE INTERNET OF THINGS

(71) Applicant: EMC IP Holding Company LLC, Hopkinton, MA (US)

(72) Inventors: Sorin Faibish, Newton, MA (US); James M. Pedone, Jr., West Boylston, MA (US); John M. Bent, Los Alamos, NM (US)

(73) Assignee: EMC IP Holding Company LLC, Hopkinton, MA (US)

( * ) Notice: Subject to any disclaimer, the term of this patent is extended or adjusted under 35 U.S.C. 154(b) by 99 days.

(21) Appl. No.: 14/585,794

(22) Filed: Dec. 30, 2014

(51) Int. Cl.
*H04L 12/24* (2006.01)
*G06F 16/951* (2019.01)

(52) U.S. Cl.
CPC .......... *H04L 41/082* (2013.01); *G06F 16/951* (2019.01)

(58) Field of Classification Search
CPC . H04L 43/04; H04L 41/082; G06F 17/30345; G06F 17/30864
USPC ........................................................ 709/221
See application file for complete search history.

(56) References Cited

U.S. PATENT DOCUMENTS

| | | | |
|---|---|---|---|
| 8,868,576 B1 | 10/2014 | Faibish et al. | |
| 9,000,896 B1* | 4/2015 | Kim ........................ | H04L 47/41 340/10.3 |
| 9,396,287 B1* | 7/2016 | Bhave ................ | G06F 17/30979 |
| 9,477,682 B1 | 10/2016 | Bent et al. | |
| 2010/0151849 A1* | 6/2010 | Weinzierl ................ | H04M 3/38 455/419 |
| 2011/0023108 A1* | 1/2011 | Geldermann ....... | H04L 63/0263 726/13 |
| 2012/0178422 A1* | 7/2012 | Gayosso Sanchez ........................ | H04W 8/183 455/411 |
| 2014/0032327 A1* | 1/2014 | Prakash ................. | G06Q 30/02 705/14.64 |
| 2015/0006548 A1* | 1/2015 | Huang .............. | G06F 17/30345 707/749 |
| 2015/0019917 A1* | 1/2015 | Fahimi .................... | G06F 11/30 714/42 |
| 2015/0067153 A1* | 3/2015 | Bhattacharyya ........ | H04L 43/04 709/224 |
| 2015/0134733 A1* | 5/2015 | Maturana ................ | H04L 43/04 709/203 |
| 2015/0223092 A1* | 8/2015 | Schmidt ............ | H04W 36/0022 455/418 |
| 2016/0094419 A1* | 3/2016 | Peacock .................. | H04L 43/04 709/213 |
| 2016/0094421 A1* | 3/2016 | Bali ........................ | H04L 43/04 709/223 |
| 2016/0163104 A1* | 6/2016 | Hou ........................ | G06T 17/00 345/520 |

(Continued)

OTHER PUBLICATIONS

U.S. Appl. No. 14/041,872 filed in the name of John Bent et al. Sep. 30, 2013 and entitled "Metadata Compression."

*Primary Examiner* — Michael A Keller
*Assistant Examiner* — Jsing Forng Lin
(74) *Attorney, Agent, or Firm* — Ryan, Mason & Lewis, LLP

(57) ABSTRACT

A system, computer program product, and computer-executable method for managing data from an Internet of Things (IoT) Device, the system, computer program product, and computer-executable method comprising receiving data from the IoT Device, analyzing the data using an analytic filter, and updating a mobile device based on the analyzing.

20 Claims, 9 Drawing Sheets

(56) References Cited

U.S. PATENT DOCUMENTS

2017/0005740 A1* 1/2017 Yang .................... H04B 17/309

* cited by examiner

DATA ANALYTICS FOR THE INTERNET OF THINGS

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data storage.

BACKGROUND

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

A system, computer program product, and computer-executable method for managing data from an Internet of Things (IoT) Device, the system, computer program product, and computer-executable method comprising receiving data from the IoT Device, analyzing the data using an analytic filter, and updating a mobile device based on the analyzing.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

Like reference symbols in the various drawings indicate like elements.

DETAILED DESCRIPTION

Figure 1:
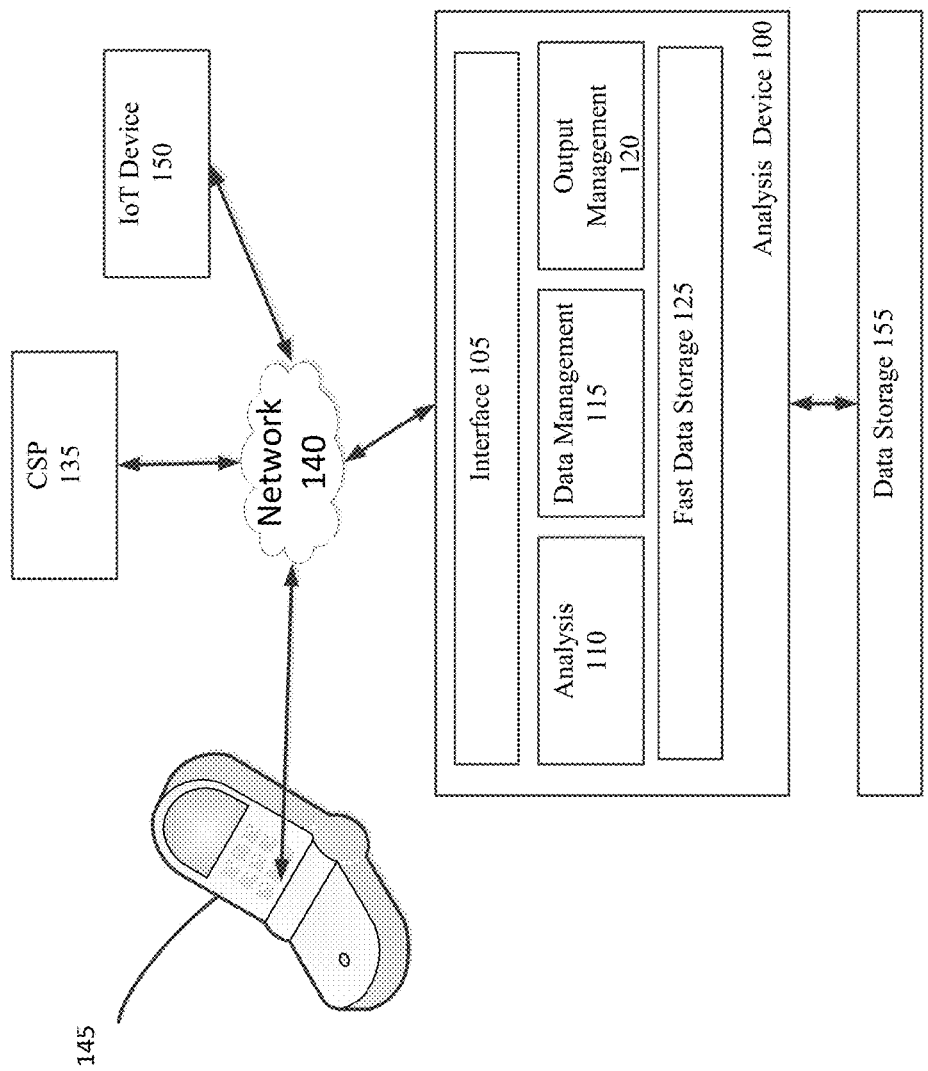
FIG. 1 is a simplified illustration of a mobile device in communication with an analysis device, in accordance with an embodiment of the present disclosure.

Traditionally, smart devices are becoming commonplace in vehicles, homes, and a part of everyday life. Generally, smart devices are connected to the Internet and allow for collection of large amounts of information that can generate huge amounts of data. Typically, in an environment including an internet of things, copious amounts of sensory data can be collected and a majority of the collected data is discarded. Traditionally, as data storage is a finite resource, much of the collected data must be discarded due to the lack of space. Generally, valuable information is lost due to lack of space and/or lack of ability to properly process the copious amounts of collected sensory data. Conventionally, the data storage industry would benefit from being able to efficiently parse, utilize, and/or minimize the storage footprint of collected data.

Traditionally, an Internet of Things (IoT) is the interconnection of uniquely identifiable embedded computing devices within the existing internet infrastructure. Conventionally, an IoT Device offers advanced connectivity of devices, systems, and servers that include a variety of protocols, domains, and application. Typically, IoT Devices are becoming more commonplace in daily life and are able to provide sensory data from everyday objects in life, such as in vehicles, airplanes, and other devices in and around the home. Conventionally, IoT Devices are able to provide a huge amount of Sensory Data providing users of the IoT Devices both useful and useless information about a user's life and interaction with their IoT Devices.

Traditionally, the amount of sensory and monitoring raw data that is produced by Internet of Things (IoT) devices is growing at a pace that will overload the capacity of global storage and available internet bandwidth. Generally, not all raw data has valuable information, yet there are not efficient means to reduce the raw data to useful information using big data analytic methods. Conventionally, the number of smart devices and/or appliances will grow at a pace that will require a large amount of cloud storage space for storing data with a low value of information. Typically, retrieving raw sensory data from smart devices and/or appliances and analyzing the raw data required a lot of network infrastructure and/or bandwidth.

In many embodiments, the current disclosure may enable creation of an analysis device to collect and analyze sensor data from Internet of Things (IoT) devices. In various embodiments, the current disclosure may enable an analysis device to communicate with one or more IoT Devices. In certain embodiments, an analysis device may be enabled to update one or more mobile devices with the sensor data, or information relating to the sensor data, received from one or more IoT Devices. In some embodiments, a mobile device may be enabled to manage an analysis device remotely. In other embodiments, an analysis device may be incorporated into a mobile device.

In most embodiments, the current disclosure may enable an analysis device to use one or more analytic filters on sensor data received from IoT Devices. In various embodiments, the use of one or more analytic filters on sensor data may be enabled to reduce the total amount of sensor data. In certain embodiments, an analysis device may be enabled to compress sensor data received from IoT Devices. In some embodiments, an analytic filter may be enabled to reduce the total amount of data points and/or amount of data while retaining the fidelity of the data. In many embodiments, a user and/or administrator may be enabled to direct an analysis device to filter received data to a specified fidelity. In various embodiments, a user and/or administrator may be enabled to manage an analysis device using a mobile device. In many embodiments, a user and/or administrator may be enabled to create and/or modify one or more analytic filters to analyze and/or filter data received by an analysis device. In various embodiments, an analytic filter may be enabled to process data from one or more sources of sensor data.

In most embodiments, filtered and/or unfiltered sensor data may be stored locally in an analysis device and/or remotely. In these embodiments, remotely stored data may be stored within one or more cloud storage providers and/or data storage external to the analysis device. In various embodiments, external data storage may include, but is not limited to, a data storage array, fast data storage appliance, and/or other data storage appliance. In some embodiments, data marked to be stored remotely may be chosen based on an output of using an analytic filter on sensor data. In many embodiments, an analysis device may be enabled to manage how much data and/or how quickly received data may be migrated to external data storage.

In many embodiments, an analysis device may include, but is not limited to, an analysis module, data management module, output management module, interface module, and/or data storage. In various embodiments, an analysis module may be enabled to utilize one or more analytic filters to analyze and/or filter received data. In these embodiments, an analysis module may be enabled to receive user and/or administrator defined analytic filters to use on received sensor data. In certain embodiments, a data management module may be enabled to manage and/or migrate data which may reside on internal data storage, external data storage, and/or within a cloud storage provider. In other embodiments, a data management module may be enabled to compress data for storage and/or migration to external data storage and/or a cloud storage provider. In other embodiments, an output management module may be enabled to format stored data for viewing by mobile devices in communication with the analysis device. In most embodiments, an interface module may enable an analysis device to communicate with one or more IoT Devices, one or more mobile devices, and/or one or more external data storage devices (i.e., a data storage array and/or Cloud Storage Provider).

In most embodiments, an analysis device may be enabled to monitor and/or analyze one or more types of data from one or more defined areas, such as, but not limited to, a house, apartment, automobile, airplane, and/or other defined area. For example, in an embodiment, one or more IoT devices may be used through a household to collectively measure the power consumption of the household. In this embodiment, while an IoT device at the power meter of the entire house can record data relating to the average and peak power consumption of the house overall, an IoT device at the power meter cannot detect how much one or more appliances within the house affect power consumption of the household. In this embodiment, if each appliance within the household is IoT enabled, a home owner can use data collected to gain a better picture of the power consumption of the entire household. In addition, in this embodiment, a homeowner will be enabled to detect that peak power consumption has occurred and, by using analytic filters on the received data from the IoT devices, will be enabled to determine which appliances and/or devices within the home consume the most power and/or cause the peak power level to be reached.

Further, in this embodiment, an analysis device will enable a homeowner to analyze the workload of each appliance and/or device within their home. Data collected from these IoT devices can be filtered and/or compressed and moved to the cloud. In many embodiments, an analysis device may be enabled to use data stored within the cloud to search for other IoT appliances and/or devices that are similar to IoT appliances and/or devices in a user's household. In various embodiments, a user may be enabled to use data found in the cloud from devices similar to a user's household IoT devices and/or appliances to determine whether a device and/or appliance is behaving and/or performing similar to other similar devices and/or appliances. In certain embodiments, if an analysis device determines that an appliance and/or device in a household operates within specifications compared to other similar appliances and/or devices, the analysis device may be enabled to remove one or more warnings to the user of the household.

In many embodiments, an analysis device may be enabled to receive data analytics from a plurality of IoT devices and may allow users to download different analytic filters that may be used to analyze received sensor data. In various embodiments, an analysis device may be enabled to utilize one or more analytic filters on one or more portions of received sensory data. In some embodiments, a mobile device may be enabled to measure the amount of information received from each IoT device in communication with the mobile device. In most embodiments, a mobile device may enable users to select a level of precision and/or detail by which the mobile device analyzes received sensor data.

In various embodiments, an analysis device may be enabled to use data analysis filters to reduce an amount of raw data to important sensory information. In most embodiments, an analysis device may enable a user to compress and analyze received sensory data to reduce the amount of storage space required for the analyzed data. In some embodiments, an analysis device may be enabled to use data analysis filters to reduce the amount of network Bandwidth required to transfer received data to cloud data storage. In most embodiments, a data analytics filter may implement one or more algorithms that may reduce data to only relevant information using machine learning techniques to analyze data and extract relevant information in relation to the specific IoT devices and specific to usage of the data to collect the user specific information.

In many embodiments, the current disclosure may enable a mobile device to manage an analysis device that may be enabled to receive data from one or more sources of sensor data from one or more IoT devices. In certain embodiments, a mobile device may be enabled to direct an analysis device to analyze, compress, and/or filter received data based on user defined parameters.

In many embodiments, the current disclosure may enable an analysis device to reduce the amount of data received from each IoT appliance and/or device. In various embodiments, the total stream of data received from each IoT appliance and/or device within a defined area (i.e., household, apartment, car, airplane, data center, and/or other defined area) may be too much to save forever within the cloud. In certain embodiments, an analysis device may be enabled to sample received data from IoT devices and/or appliances based on the frequency of receiving data points. In some embodiments, an IoT device and/or appliance may update an analysis device every quarter second, however, data from the IoT device and/or appliance may only be useful stored at 1 data point every 10 seconds. In other embodiments, an analysis device may be enabled to adjust sampling rates on each IoT device and/or appliance based on the amount of data received and/or based on user input.

Information regarding data compression, metadata compression, and analytics filters may be found in U.S. patent application Ser. No. 13/799,228 entitled "PARALLEL COMPRESSION OF DATA CHUNKS OF A SHARED DATA OBJECT USING A LOG-STRUCTURED FILE SYSTEM" U.S. patent application Ser. No. 14/041,872 entitled "METADATA COMPRESSION," and U.S. Pat. No. 8,868,576 entitled "STORING FILES IN A PARALLEL COMPUTING SYSTEM BASED ON USER-SPECIFIED PARSER FUNCTION" which are commonly assigned herewith and incorporated by reference herein.

Refer to the example embodiment of FIG. 1. FIG. 1 is a simplified illustration of a mobile device in communication with an analysis device, in accordance with an embodiment of the present disclosure. As shown, Analysis device 100 includes interface 105, Analysis module 110, data management module 115, output management module 120, and fast data storage 125. Analysis Device 100 is enabled to communicate with Cloud Storage Provider 135 using Network 140. Analysis Device 100 is in communication with data storage 155. In many embodiments, external data storage may be a data storage array, Cloud Storage Provider, and/or other data storage appliance. Analysis Device 100 is enabled to communicate with IoT device 150 using Interface 105. In this embodiment, mobile device 145 is in communication with Analysis Device 100 through Network 140. Mobile device 145 is enabled to utilize Analysis Device 100 to analyze, manage, and/or augment sensory data received by Analysis Device 100 from IoT devices. Mobile device 145 is enabled to direct Analysis Device 100 to store received sensory data within fast data storage 125, data storage 155, and/or within CSP 135. In some embodiments, an analysis device may be in communication with a cloud storage provider and may be enabled to upload data to the cloud storage provider as needed.

Figure 2:
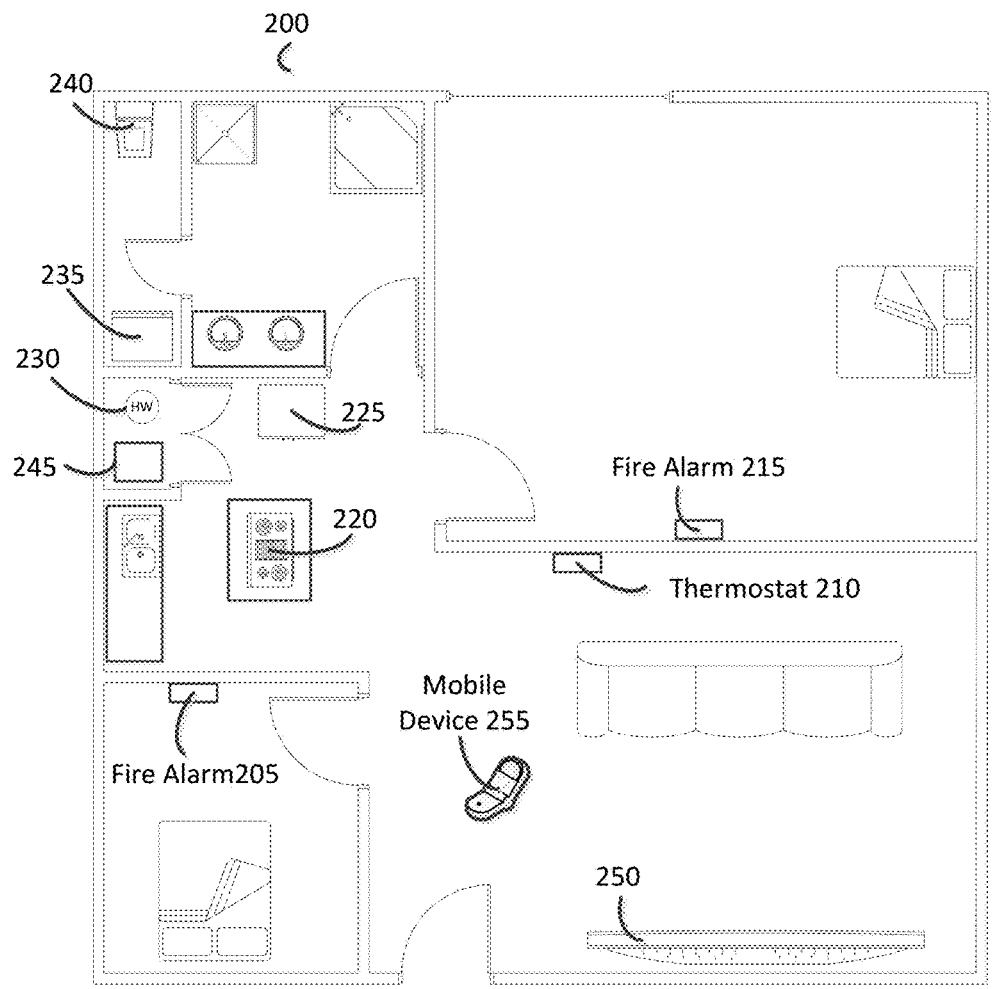
FIG. 2 is a simplified illustration of a mobile device in communication with a plurality of Internet of Things (IoT) devices in an apartment, in accordance with an embodiment of the present disclosure.

Refer to the example embodiment of FIG. 2. FIG. 2 is a simplified illustration of a mobile device in communication with a plurality of Internet of Things (IoT) devices in an apartment, in accordance with an embodiment of the present disclosure. Apartment 200 includes a plurality of IoT devices that are enabled to record and/or send sensory data upon request. In this embodiment, Apartment 200 includes IoT devices within toilet 240, Washer and Dryer 235, Hot water heater 230, refrigerator 225, stove 220, fire alarms 205, 215, thermostat 210, and television 250. Each of the IoT devices is in communication with Analysis Device 245. Mobile device 255 is in communication with Analysis device 245 and is enabled to receive sensory data from each IoT device within apartment 200.

In some embodiments, an analysis device may include a wireless router and/or analysis device to execute analysis filters on data received from each IoT device within the apartment. In various embodiments, an analysis device may store locally data received from each IoT device registered with the analysis device. In certain embodiments, an analysis device may update one or more mobile devices in communication with the wireless control device. In some embodiments, a wireless control device may be enabled to upload received sensory data to one or more cloud storage providers and/or external data storage.

In FIG. 2, IoT Device within toilet 240 is enabled to provide sensory data related to water usage. IoT Device within Washer and Dryer 235 is enabled to provide sensory data related to utility usage, appliance efficiency, and/or other sensory data. IoT Device within hot water heater 230 is enabled to provide sensory data related to utility usage, appliance efficiency, and/or other sensory data. IoT Device within refrigerator 225 is enabled to provide sensory data related to utility usage, appliance efficiency, temperature readings from one or more places within refrigerator 225, and/or other sensory data. IoT Device within stove 220 is enabled to provide sensory data related to utility usage, appliance efficiency, maintenance information, and/or other sensory data. IoT Devices within Fire Alarms 215, 205 are enabled to provide sensory data related to the operation of fire alarms 215, 205. For example, in this embodiment, fire alarms 215, 205 are enabled to provide sensory data on carbon monoxide levels, particulate levels, and/or visibility within apartment 200. IoT Device within thermostat 210 is enabled to provide sensory data relating to utility usage, heat and/or A/C activity, daily temperature, and/or other sensory data. IoT Device within television 250 is enabled to provide sensory data related to utility usage, hours of usage, type of usage, and/or other sensory data. Mobile device 255 is enabled to retrieve one or more portions of sensory data provided by toilet 240, hot water heater 230, washer and dryer 235, refrigerator 225, stove 220, fire alarms 205, 215, thermostat 210, and television 250 using analysis device 245.

In this embodiment, Mobile device 255 is enabled to direct analysis device 245 to execute one or more analytic filters on one or more portions of sensory data received from IoT devices within apartment 200. Mobile device 255 is enabled to direct analysis device 245 to compress one or more portions of sensory data received from IoT devices within Apartment 200. Mobile device 255 is enabled to direct analysis device 245 to upload stored sensory data to one or more cloud storage providers. Mobile device 255 is enabled to upload filtered sensory data to one or more cloud storage providers.

Figure 3:
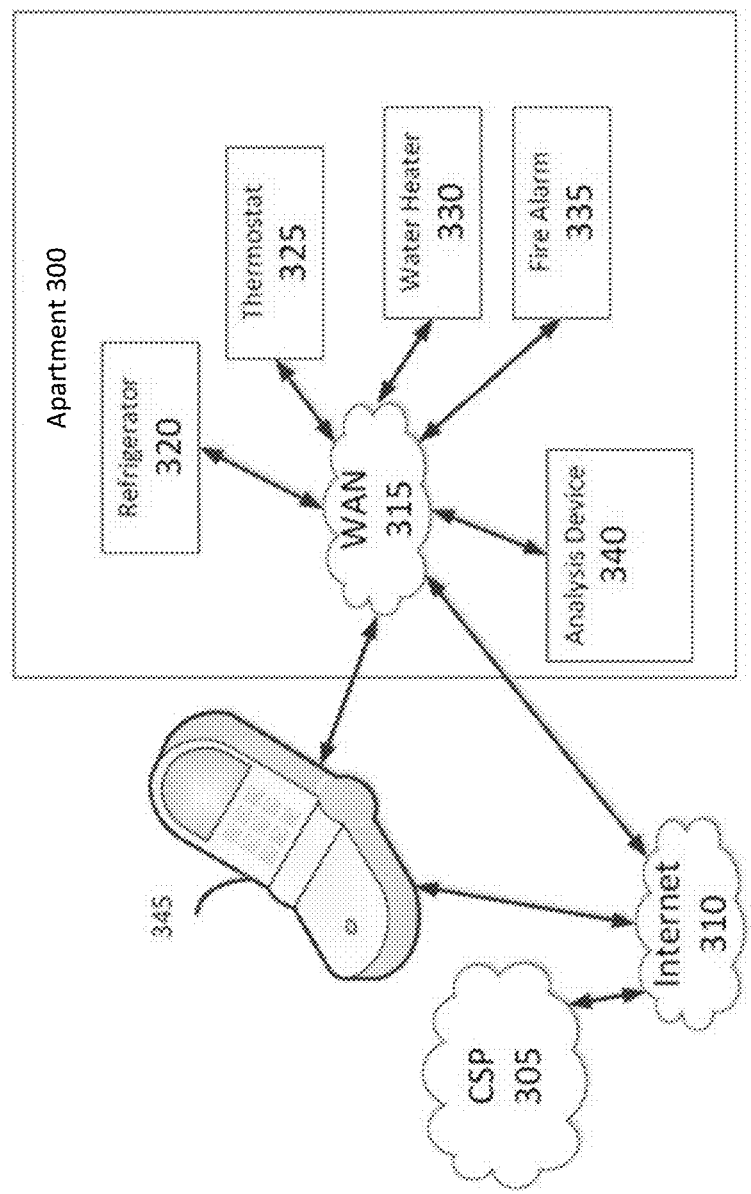
FIG. 3 is an alternate simplified illustration of a mobile device in communication with a plurality of Internet of Things (IoT) devices in an apartment, in accordance with an embodiment of the present disclosure.

Refer to the example embodiment of FIG. 3. FIG. 3 is an alternate simplified illustration of a mobile device in communication with a plurality of Internet of Things (IoT) devices in an apartment, in accordance with an embodiment of the present disclosure. In this embodiment, apartment 300 includes refrigerator 320, thermostat 325, water heater 330, fire alarm 335, Analysis device 340, and Wide Area Network (WAN) 315. Refrigerator 320, thermostat 325, water heater 330, and fire alarm 335 each include an IoT device enabled to record sensory data and send the sensory data to Analysis device 340 using WAN 315. Analysis device 340 is enabled to communicate to cloud storage provider (CSP) 305 using WAN 315 and internet 310. Mobile device 345 is enabled to communicate with wireless control device using either WAN 315 or internet 310. Mobile device 345 is enabled to execute one or more analytic filters on sensory data received by Analysis device 340. Mobile device 345 is enabled to direct wireless control device 340 to upload received sensory data to CSP 305 and/or upload filtered sensory data to CSP 305.

Figure 4:
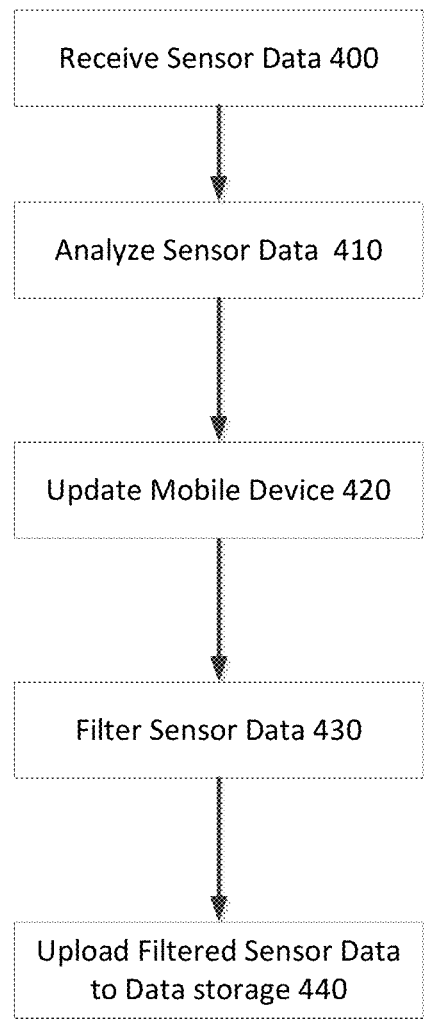
FIG. 4 is a simplified flowchart of a method of managing sensory data from an Internet of Things (IoT) Device, in accordance with an embodiment of the present disclosure.

Refer to the example embodiments of FIGS. 1 and 4. FIG. 4 is a simplified flowchart of a method of managing sensory date from an Internet of Things (IoT) Device, in accordance with an embodiment of the present disclosure. Analysis Device 100 receives sensory data from IoT Device 150 through network 140 (Step 400). Wireless Control Analysis Device 100 utilizes analysis module 110 to analyze received data (Step 410). Analysis module 110 is enabled to determine if mobile device 145 has directed analysis module 110 to augment sensory data from IoT Device 150. In many embodiments, an analysis module may be enabled to augment sensory data by compressing the sensory data, increasing and/or decreasing fidelity of the sensory data, and/or processing the sensory data. Analysis Device 100 updates mobile device 145 through network 140 (Step 420). An administrator and/or user uses Mobile Device 145 to direct Analysis device 100 to filter sensory data received from IoT Device 150. Analysis Device 100 uses analysis module 110 to filter sensory data (Step 430) and store results in fast data storage 125. Data Management module 115 periodically uploads filtered sensory data stored on data storage 125 to Cloud Storage Provider 135 (Step 440).

Figure 5:
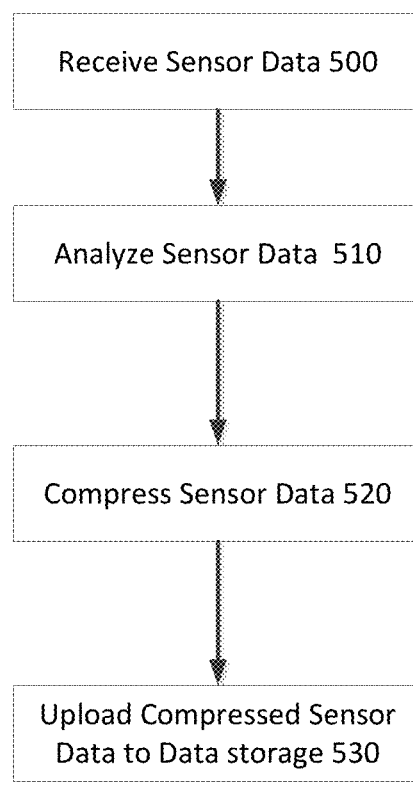
FIG. 5 is an alternate simplified flowchart of a method of managing sensory data from an Internet of Things (IoT) Device as shown in FIG. 1, in accordance with an embodiment of the present disclosure.

Refer to the example embodiment of FIGS. 1 and 5. FIG. 5 is an alternate simplified flowchart of a method of managing sensory data from an Internet of Things (IoT) Device as shown in FIG. 1, in accordance with an embodiment of the present disclosure. As shown in FIG. 1, Analysis device 100 receives sensory data from IoT Device 150 (Step 500). Analysis Device 100 utilizes analysis module 110 to analyze received sensory data (Step 510). Data management module 115 compresses sensory data (Step 520) and stores compressed sensory data on fast data storage 125. Periodically, Data Management module 115 uploads compressed sensory data to Cloud Storage Provider 135 using network 140 (Step 530).

Figure 6:
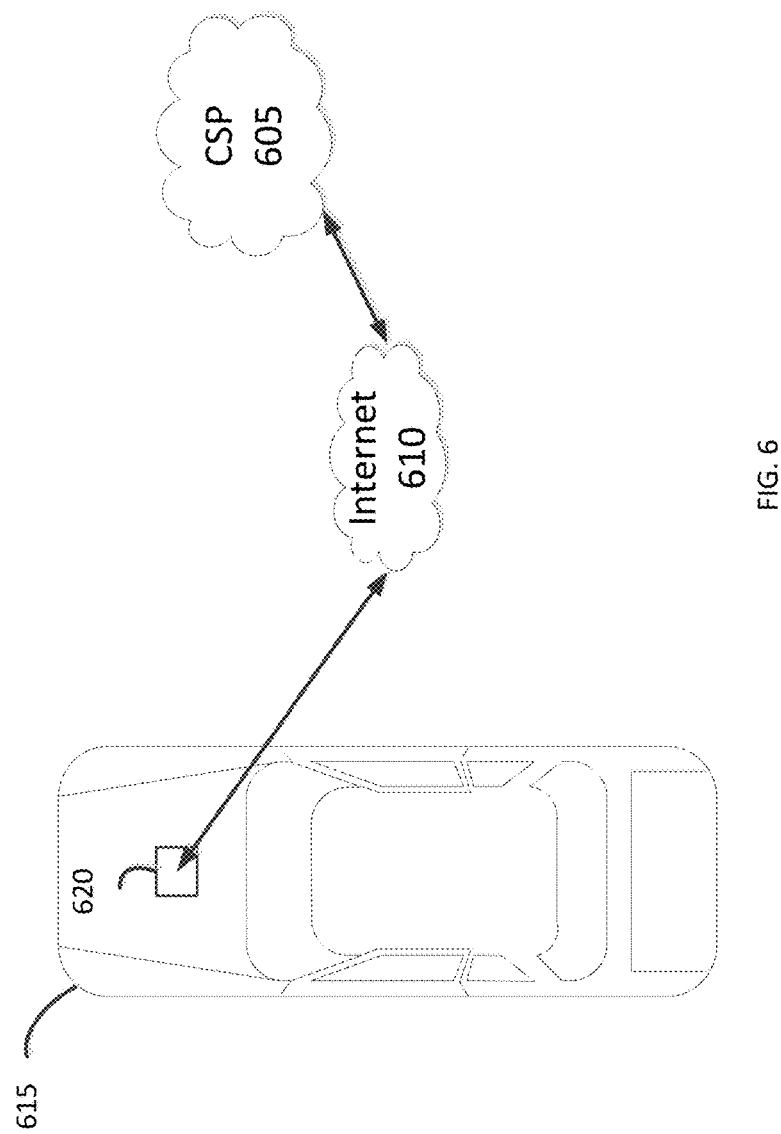
FIG. 6 is a simplified illustration of a wireless control device managing sensory data from an automobile, in accordance with an embodiment of the present disclosure.

Refer to the example embodiment of FIG. 6. FIG. 6 is a simplified illustration of a wireless control device managing sensory data from an automobile, in accordance with an embodiment of the present disclosure. As shown, automobile 615 includes Analysis device 620 and is in communication with internet 610. In this embodiment, automobile 615 includes a plurality of Internet of Things enabled devices which are enabled to record sensory data from automobile 615. In this embodiment, automobile 615 includes IoT devices in the brakes, engine, and placed throughout automobile 615. Each IoT Device is enabled to send sensory data to Analysis device 620. Analysis device 620 is enabled to analyze and/or compress received sensory data and periodically upload received data to cloud storage provider 605.

Figure 7:
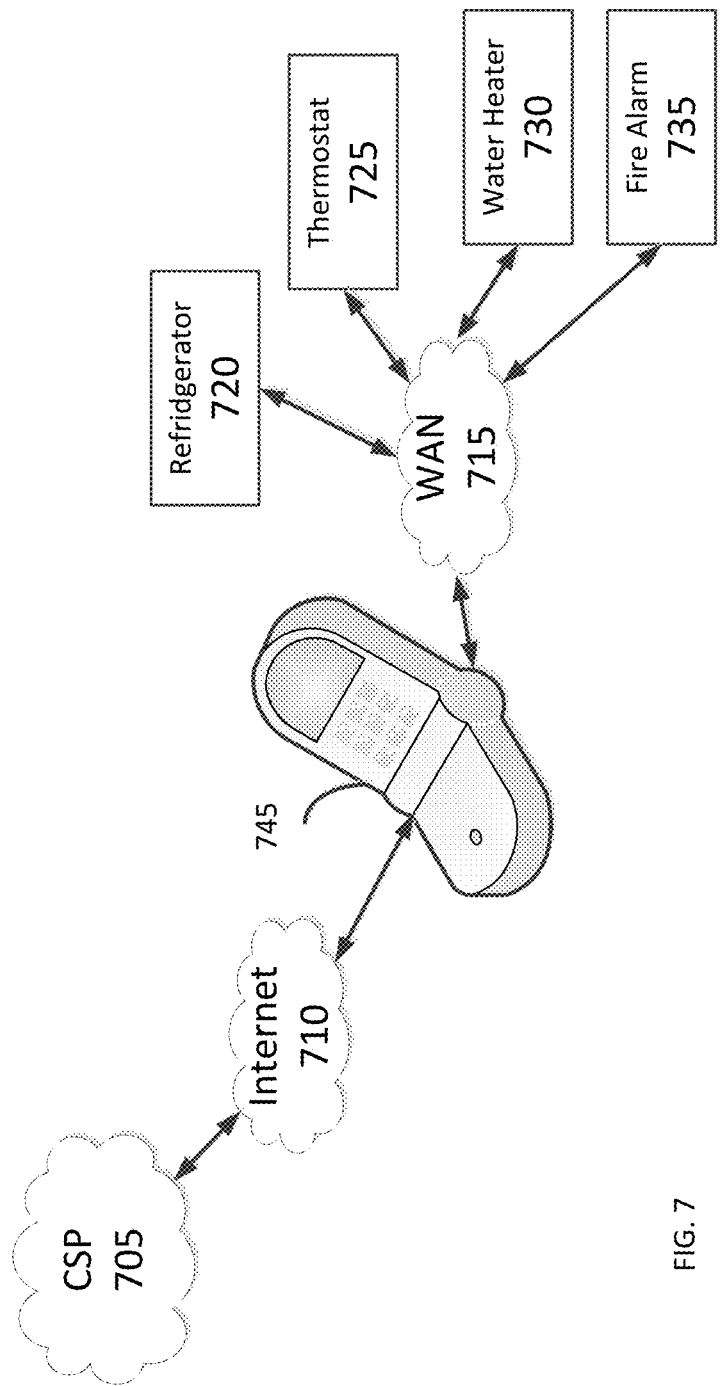
FIG. 7 is a simplified illustration of a mobile device managing sensory data received from a plurality of Internet of Things Devices, in accordance with an embodiment of the present disclosure.

Refer to the example embodiment of FIG. 7. FIG. 7 is a simplified illustration of a mobile device managing sensory data received from a plurality of Internet of Things Devices, in accordance with an embodiment of the present disclosure. As shown, the IoT devices include refrigerator 720, thermostat 725, water heater 730, and fire alarm 735. Each IoT device is in communication with WAN 715 which enables communication with mobile device 745. In this embodiment, an Analysis device is integrated into mobile device 745, which enables mobile device 745 to receive, analyze and/or compress sensory data from each IoT Device. Mobile device 745 is in communication with Cloud Storage provider 705 through internet 710. In this embodiment, Mobile Device 745 is enabled to upload processed sensory data from each IoT Device to CSP 705.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium.

Figure 8:
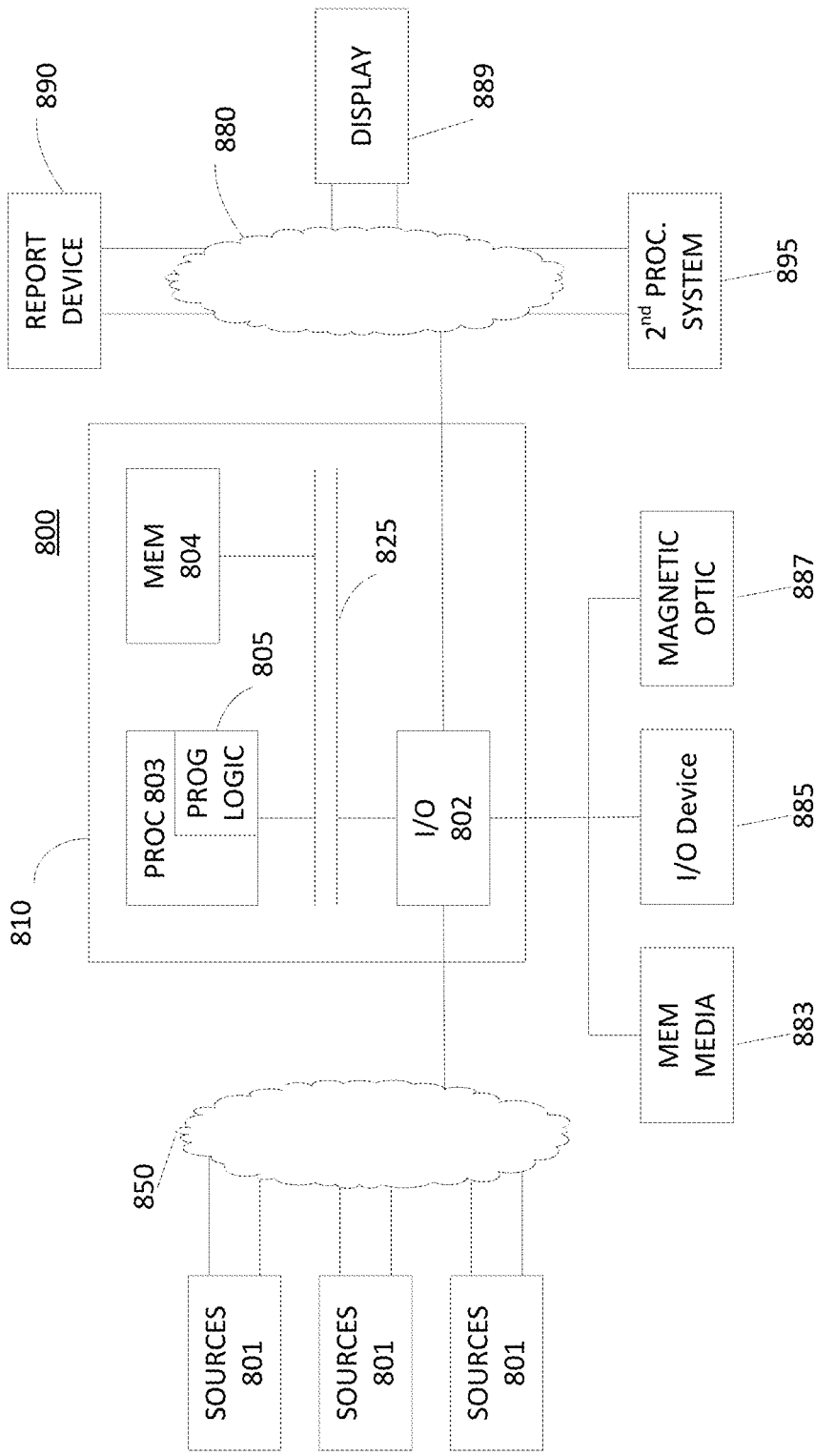
FIG. 8 is an example of an embodiment of an apparatus that may utilize the techniques described herein, in accordance with an embodiment of the present disclosure.

FIG. 8 is a block diagram illustrating an apparatus, such as a computer 810 in a network 800, which may utilize the techniques described herein according to an example embodiment of the present invention. The computer 810 is configured interact with multiple data sources 801 via a network 850. The computer 810 may include one or more I/O ports 802, a processor 803, and memory 804, all of which may be connected by an interconnect 825, such as a bus. Processor 803 may include program logic 805. The I/O port 802 may provide connectivity to memory media 883, I/O devices 885, and drives 887, such as magnetic or optical drives. The computer 810 interfaces via a network 880 with a report device 890 and a display 889. The computer 810 also interfaces via the network 880 with an additional processing system denoted as second processing system 895. When the program code is loaded into memory 804 and executed by the computer 810, the machine becomes an apparatus for practicing the invention. When implemented on one or more general-purpose processors 803, the program code combines with such a processor to provide a unique apparatus that operates analogously to specific logic circuits. As such, a general purpose digital machine can be transformed into a special purpose digital machine.

Figure 9:
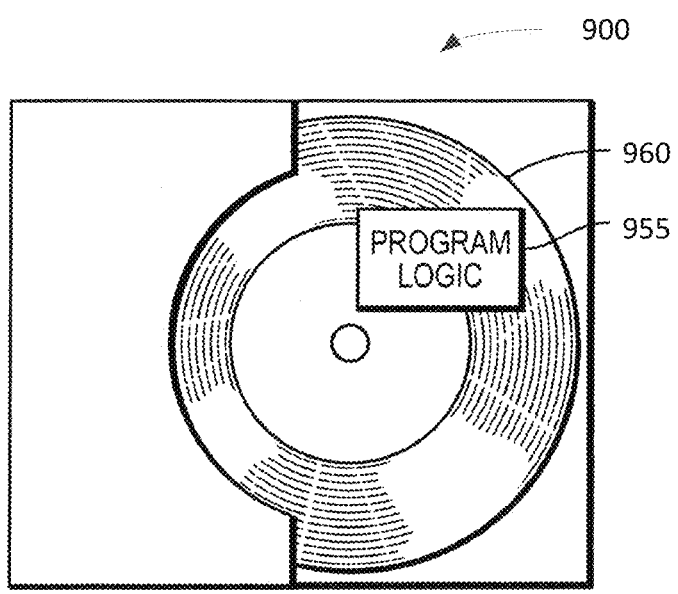
FIG. 9 is an example of a method embodied on a computer readable storage medium that may utilize the techniques described herein, in accordance with an embodiment of the present disclosure.

FIG. 9 is a block diagram illustrating a method embodied on a computer readable storage medium 960 that may utilize the techniques described herein according to an example embodiment of the present invention. FIG. 9 shows Program Logic 955 embodied on a computer-readable medium 960 as shown, and wherein the Logic is encoded in computer-executable code configured for carrying out the methods of this invention and thereby forming a Computer Program Product 900. Program Logic 955 may be the same logic 805 on memory 804 loaded on processor 803 in FIG. 8. The program logic may be embodied in software modules, as modules, as hardware modules, or on virtual machines.

The logic for carrying out the method may be embodied as part of the aforementioned system, which is useful for carrying out a method described with reference to embodiments shown in, for example, FIGS. 1-9. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A computer-executable method comprising:
   receiving data from an Internet of Things (IoT) device, wherein the data includes sensor data;
   sampling the data;
   analyzing the data using an analytic filter, wherein the analytic filter reduces an amount of the data from a relatively larger amount of data to a relatively smaller amount of data, to thereby reduce an amount of storage space required for the analyzed data; and
   updating a mobile device with the data based on the analyzing;
   wherein the mobile device is enabled to control the analytic filter to filter the data to a specified fidelity different from a current fidelity of the data; and
   wherein the mobile device is enabled to control storage of at least one of the data and the reduced amount of the data in one or more data storage locations.

2. The computer-executable method of claim 1, further comprising:
   receiving a command from the mobile device related to the data; and
   updating the analytic filter based on the received command.

3. The computer-executable method of claim 2, wherein the received command modifies the analytic filter to augment the analytic filter.

4. The computer-executable method of claim 1, further comprising:
   periodically sending a portion of the data to a cloud storage provider, wherein the portion of the data is outputted from the analytic filter.

5. The computer-executable method of claim 1, wherein:
   the IoT device is related to an appliance; and
   the computer-executable method further comprises:
      searching a cloud storage provider for a set of data created from a second IoT device related to a second appliance similar to the appliance; and
      comparing the data to the set of data created from the second IoT device to determine whether the appliance is operating correctly.

6. The computer-executable method of claim 5, further comprising:
   if the appliance is not operating correctly, updating the mobile device regarding an error relating to the appliance.

7. The computer-executable method of claim 1, further comprising:
   determining a frequency at which the data is received from the IoT device; and
   sampling the data based on the frequency.

8. The computer-executable method of claim 1, further comprising:
   downloading a second analytic filter related to a second IoT device.

9. A system, comprising:
   an Internet of Things (IoT) device; and
   computer-executable program logic encoded in memory of one or more computers enabled to manage data from the IoT device, wherein the computer-executable program logic is configured for the execution of:
      receiving data from the IoT Device, wherein the data includes sensor data;
      sampling the data;
      analyzing the data using an analytic filter, wherein the analytic filter reduces an amount of the data from a relatively larger amount of data to a relatively smaller amount of data, to thereby reduce an amount of storage space required for the analyzed data; and
      updating a mobile device with the data based on the analyzing;
      wherein the mobile device is enabled to control the analytic filter to filter the data to a specified fidelity different from a current fidelity of the data; and
      wherein the mobile device is enabled to control storage of at least one of the data and the reduced amount of the data in one or more data storage locations.

10. The system of claim 9, wherein the computer-executable program logic is further configured for the execution of:
    receiving a command from the mobile device related to the data; and
    updating the analytic filter based on the received command.

11. The system of claim 10, wherein the received command modifies the analytic filter to augment the analytic filter.

12. The system of claim 9, wherein the computer-executable program logic is further configured for the execution of:
    periodically sending a portion of the data to a cloud storage provider, wherein the portion of the data is outputted from the analytic filter.

13. The system of claim 9, wherein:
    the IoT device is related to an appliance; and
    the computer-executable program logic is further configured for the execution of:
       searching a cloud storage provider for a set of data created from a second IoT device related to a second appliance similar to the appliance; and
       comparing the data to the second set of data created from the second IoT device to determine whether the appliance is operating correctly.

14. The system of claim 13, wherein the computer-executable program logic is further configured for the execution of:
    if the appliance is not operating correctly, updating the mobile device regarding an error relating to the appliance.

15. The system of claim 9, wherein the computer-executable program logic is further configured for the execution of:
    determining a frequency at which the data is received from the IoT device; and
    sampling the data based on the frequency.

16. The system of claim 9, wherein the computer-executable program logic is further configured for the execution of:
    downloading a second analytic filter related to a second IoT device.

17. A computer program product comprising:
    a non-transitory computer readable medium encoded with computer executable code, the code configured to enable the execution of:
       receiving data from an Internet of Things (IoT) device, wherein the data includes sensor data;
       sampling the data;
       analyzing the data using an analytic filter, wherein the analytic filter reduces an amount of the data from a relatively larger amount of data to a relatively smaller amount of data, to thereby reduce an amount of storage space required for the analyzed data; and updating a mobile device with the data based on the analyzing;

wherein the mobile device is enabled to control the analytic filter to filter the data to a specified fidelity different from a current fidelity of the data; and wherein the mobile device is enabled to control storage of at least one of the data and the reduced amount of the data in one or more data storage locations.

18. The computer-executable method of claim 17, the code further configured to enable the execution of:

receiving a command from the mobile device related to the data; and updating the analytic filter based on the received command.

19. The computer-executable method of claim 18, wherein the received command modifies the analytic filter to augment the analytic filter.

20. The computer-executable method of claim 17, the code further configured to enable the execution of:

periodically sending a portion of the data to a cloud storage provider, wherein the portion of the data is outputted from the analytic filter.

* * * * *